Nov. 3, 1936.  W. G. SCHLOTTMANN  2,059,751
EGG TRAY SUPPORTING AND TILTING DEVICE
Filed July 15, 1935
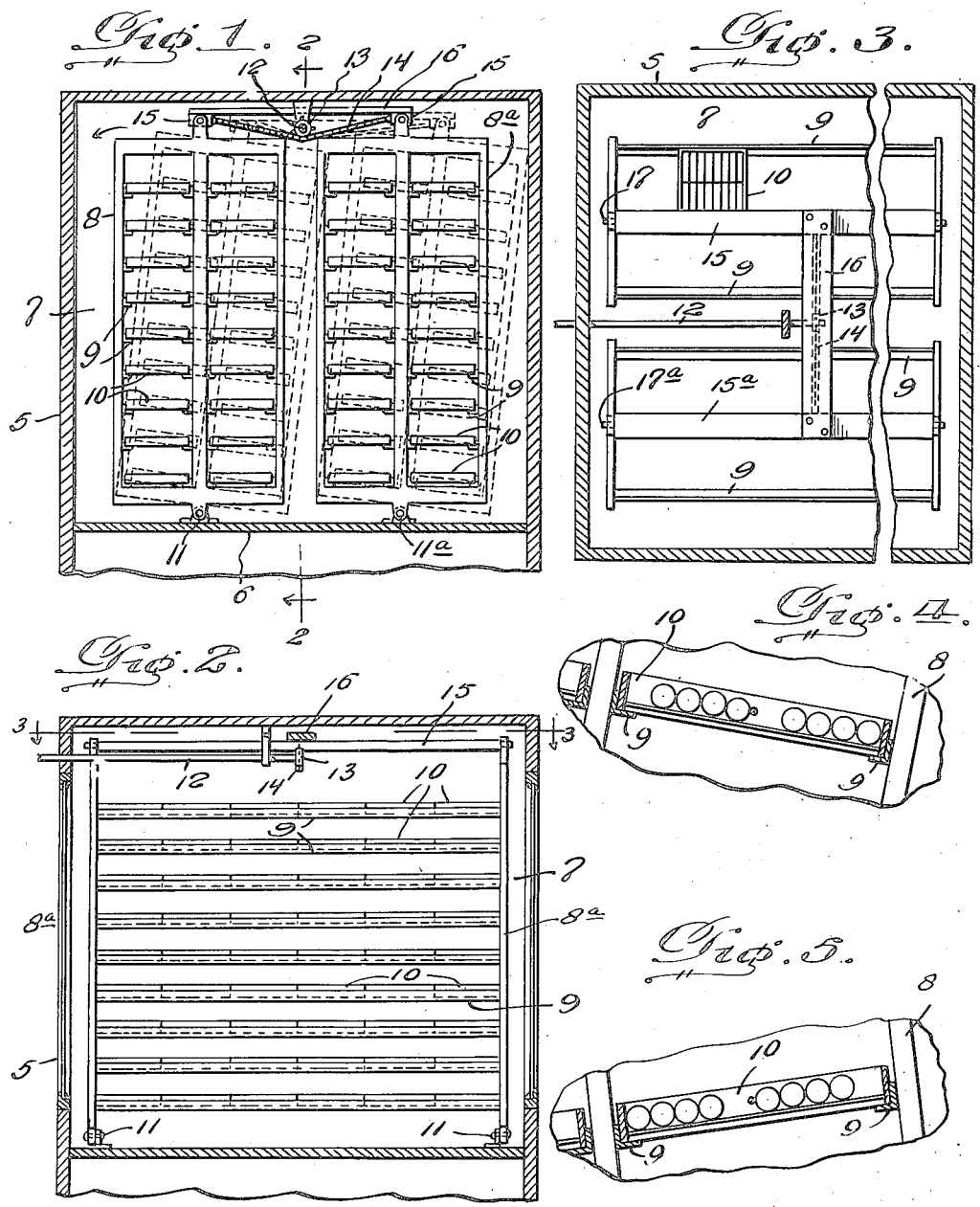
Inventor
Willie Gayle Schlottmann
By J. Stanley Burch
Attorney Patented Nov. 3, 1936

2,059,751

UNITED STATES PATENT OFFICE 2,059,751

EGG TRAY SUPPORTING AND TILTING DEVICE

Willie Gayle Schlottmann, Comfort, Tex.

Application July 15, 1935, Serial No. 31,492

2 Claims. (Cl. 119—44)

This invention relates to incubators of the cabinet type, and has more particular reference to an improved egg tray supporting and tilting device for such type of incubators.

The primary object of the present invention is to provide an egg tray supporting and tilting device by the use of which the eggs in the trays may be effectively and conveniently turned.

A further object of the present invention is to provide an egg tray supporting and tilting device of the above kind which is extremely simple and durable in construction and efficient in use.

Other objects and features of the invention will become apparent from the following description when considered in connection with the accompanying drawing, in which:

Figure 1 is a fragmentary vertical sectional view of an incubator equipped with an egg tray supporting and tilting device embodying the present invention.

Figure 2 is a vertical section on line 2—2 of Figure 1.

Figure 3 is a horizontal section on line 3—3 of Figure 2, partly broken away.

Figure 4 is an enlarged fragmentary section through one of the tray supporting racks and illustrating how the eggs are rolled to one side of a tray when such rack is tilted in one direction, and Figure 5 is a view similar to Figure 4 showing how the eggs are rolled to the opposite side of the tray when the rack is tilted in the opposite direction.

Referring more in detail to the drawing, 5 indicates the casing or cabinet structure of an incubator, and 6 a horizontal wall within said casing or cabinet structure. Arranged within the chamber 7 above the wall 6 of the casing or cabinet structure 5 are a pair of rigid egg tray supporting racks 8 and 8a. These egg tray supporting racks are of similar construction, and each includes a rigid open frame in which are rigidly secured a plurality of pairs of opposed egg tray supporting bars or rails 9 for removably receiving and supporting a plurality of egg trays 10 in a plurality of vertical tiers and in spaced superposed relation in each tier. The rigid egg tray supporting racks 8 and 8a are pivoted at their bottoms as at 11 for bodily tilting movement laterally in opposite directions so that the egg trays may be shifted either to the inclined position of Figure 4 or to the oppositely inclined position of Figure 5. Thus, when the egg trays are placed in the racks and partially filled with eggs as illustrated in Figures 4 and 5, the lateral tilting of such racks will cause the eggs to roll over by gravity and thus be properly turned as required in the process of incubation.

For bodily tilting the racks, I provide suitable mechanism consisting of a shaft 12 journaled in the upper portion of the casing 5 at a point between the adjacent sides of and above the racks, the inner or rear end of shaft 12 being operatively connected to the racks at the top of the latter, and the forward end of shaft 12 projecting through the front of the casing or cabinet structure 5 so that it may be actuated by an operating means located exteriorly of the cabinet or casing. The operating connection between the racks and shaft 12 preferably consists of a sprocket wheel 13 secured on the inner or rear end of shaft 12, and a sprocket chain 14 attached at its ends to horizontal bars 15 connecting the front and rear frame members of the respective racks 8 and 8a, the intermediate portion of chain 14 passing under and being in driving engagement with the sprocket wheel 13. Thus, upon turning shaft 12 in one direction, the sprocket chain 14 will be caused to travel laterally of the casing so as to tilt the rack 8 to the dotted line position of Figure 1. A similar tilting of rack 8a is simultaneously had by providing a connecting bar 16 between the bars 15 and 15a of the racks 8 and 8a. This connecting bar 16 is shown as rigidly attached to the bars 15 and 15a, the latter being pivoted at their ends in the front and rear frame members of the racks, as at 17 and 17a. However, the bars 15 and 15a may be rigid with the racks, and the connecting bar 16 may be pivotally connected at its ends to the bars 15 and 15a, it simply being essential that a rigid connection be provided between the two racks so that when one of the racks is tilted a corresponding tilting movement is imparted to the other. Obviously, when the shaft 12 is rotated in the opposite direction, the chain 14 is shifted to the left of Figure 1 so as to tilt rack 8a in a similar direction and simultaneously cause movement of bar 16 so that rack 8 will be simultaneously similarly tilted.

It will be seen that the egg tray supporting and tilting device of the present invention is extremely durable and simple. The invention avoids the necessity of individual pivoted tray supports and operative connection with all of the individual tray supports, as heretofore practiced.

It will of course be apparent that the shaft 12 may be actuated by an operating means located exteriorly of the casing or cabinet structure 5, and such operating means may consist of an electric motor, a hand crank, or other suitable device whereby the tilting of the racks may be effected at the desired intervals.

From the foregoing description, it is believed that the construction and operation, as well as the advantages of the present invention, will be readily understood and appreciated by those skilled in the art. Minor changes in the details of construction illustrated and described are contemplated within the spirit of the invention as claimed.

What I claim as new is:

1. In an incubator, a pair of egg tray supporting racks arranged in side by side relation, each of said racks comprising an open rigid frame having means for supporting a tier of egg trays in spaced superposed relation, means pivotally mounting said racks for lateral bodily tilting movement about an axis located at the bottom of each rack, and means operatively connected to the tops of said racks for selectively tilting them simultaneously in either of opposite directions.

2. In an incubator, a pair of egg tray supporting racks arranged in side by side relation, each of said racks comprising an open rigid frame having means for supporting a tier of egg trays in spaced superposed relation, means pivotally mounting said racks for lateral bodily tilting movement about an axis located at the bottom of each rack, and means operatively connected to the tops of said racks for selectively tilting them simultaneously in either of opposite directions, said last-named means comprising a connecting rod between the tops of the racks, a sprocket chain attached at its opposite ends to the tops of the respective racks, an operating shaft, and a sprocket wheel carried by said shaft and operatively engaged with said sprocket chain.

WILLIE GAYLE SCHLOTTMANN.